Aug. 22, 1944.   E. H. BICKLEY   2,356,441
APPARATUS FOR PRODUCING THIRD DIMENSIONAL MOTION PICTURES
Filed Jan. 12, 1943   2 Sheets-Sheet 1
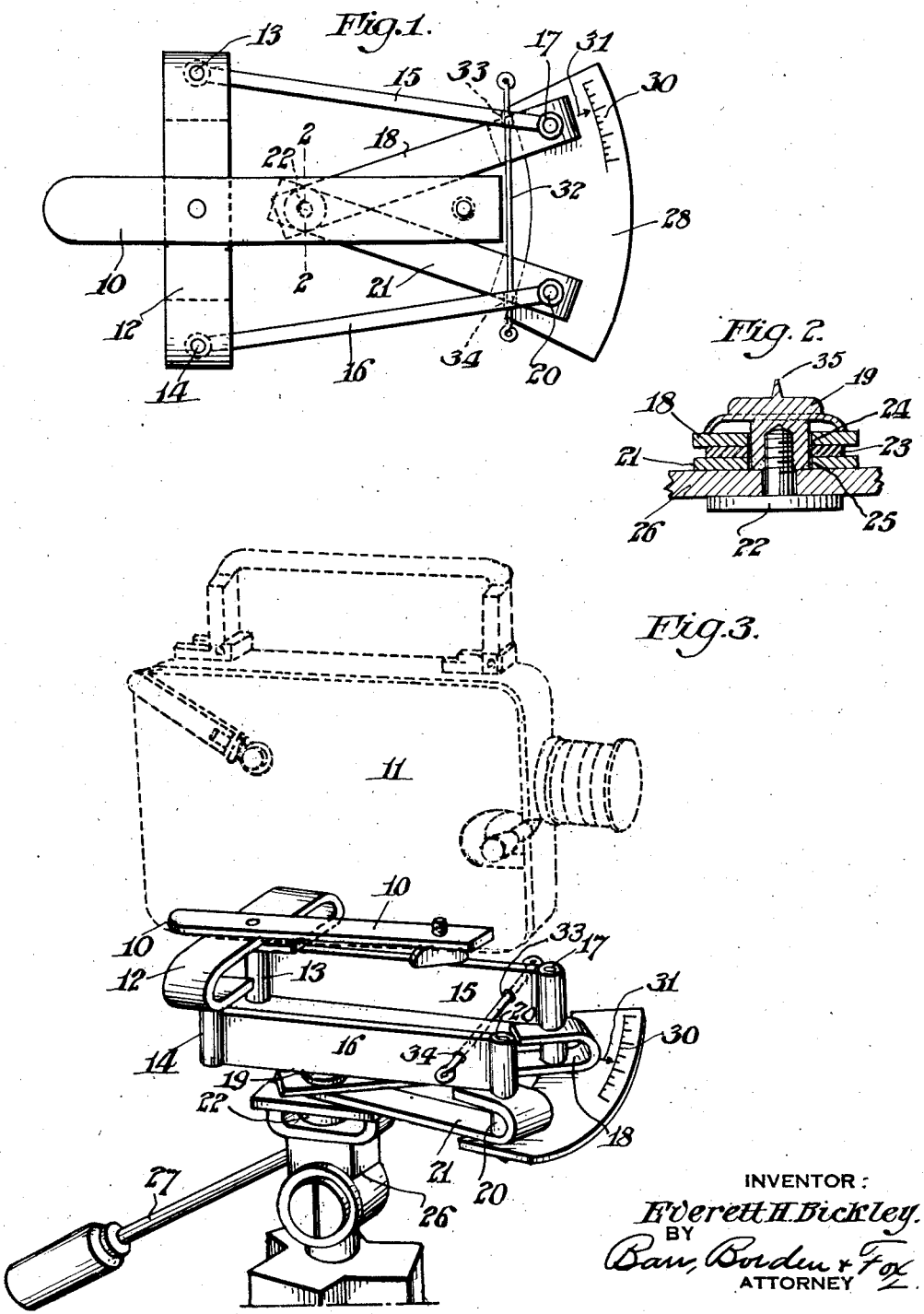

Aug. 22, 1944.  E. H. BICKLEY  2,356,441
APPARATUS FOR PRODUCING THIRD DIMENSIONAL MOTION PICTURES
Filed Jan. 12, 1943  2 Sheets-Sheet 2
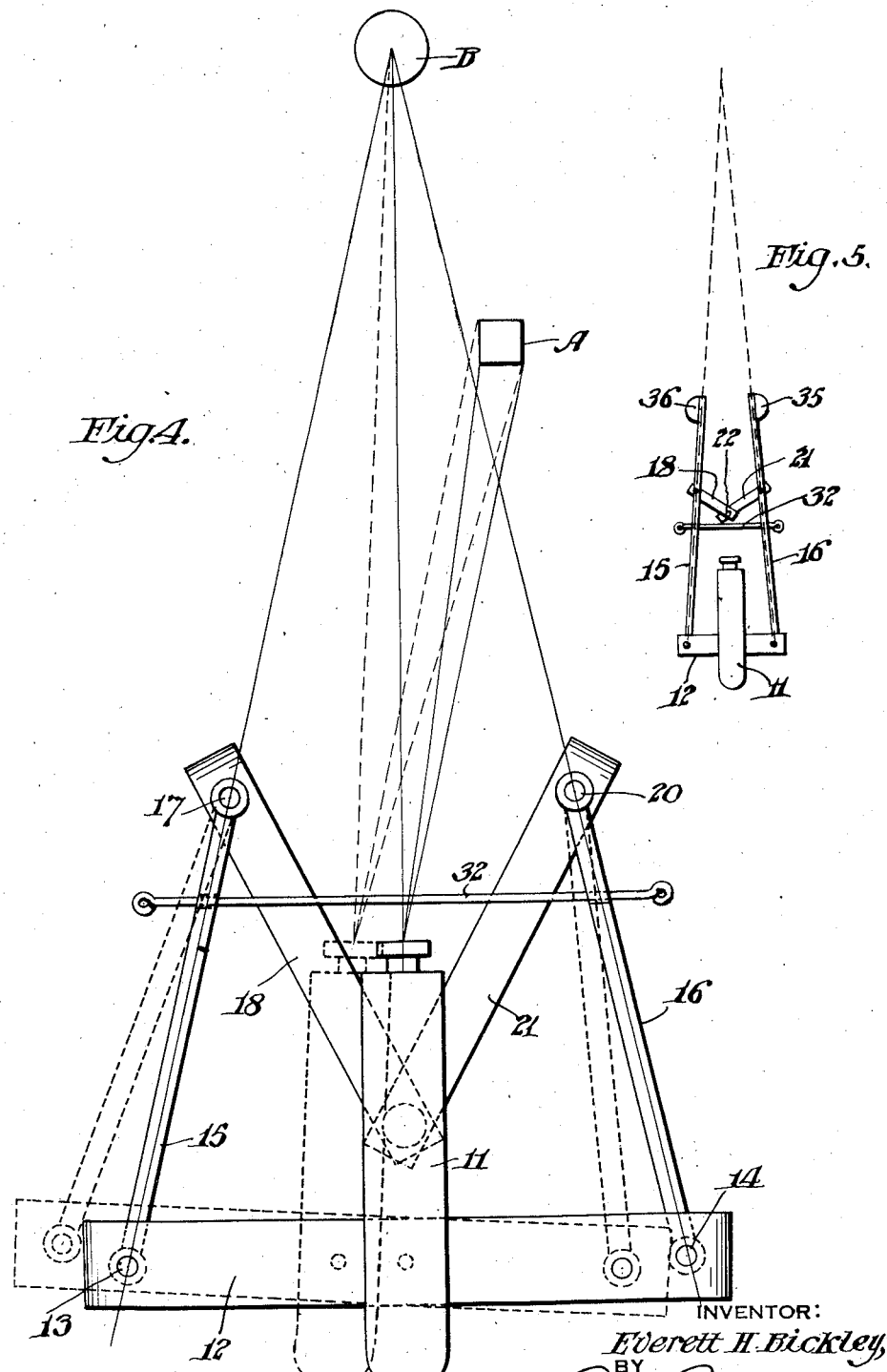
INVENTOR:
Everett H. Bickley,
BY
Barr, Borden & Fox
ATTORNEY Patented Aug. 22, 1944

2,356,441

UNITED STATES PATENT OFFICE 2,356,441

APPARATUS FOR PRODUCING THIRD DIMENSIONAL MOTION PICTURES

Everett H. Bickley, Bala-Cynwyd, Pa.

Application January 12, 1943, Serial No. 472,151

6 Claims. (Cl. 88—16.6)

The present invention relates to motion pictures and more particularly to an apparatus for producing third dimensional motion pictures.

In devices for giving depth to pictures, similar to binocular vision, one of the more familiar is the use of stereoscopic cameras using double photographs taken approximately three inches apart and then viewing these photographs through a device so that each eye of the observer sees one of the photographs. While the effect of depth in motion pictures can thus be approximated by stereoscopic methods, the taking of double photographs on the film is not only complicated, troublesome and expensive, but requires every observer to wear a special form of spectacle to obtain the desired result.

Some of the objects of the present invention are; to provide a new and novel apparatus for producing motion pictures having a lifelike third dimension appearance; to provide an apparatus for giving depth to motion pictures without requiring dual photographs of the object or scene; to provide an apparatus whereby and wherein it is unnecessary for the user to wear any viewing device in order to obtain the effect of a third dimension in motion pictures under observation; to provide an apparatus wherein and whereby third dimension motion pictures can be obtained in black and white or color without the use of special film, special cameras, or special projectors; to provide a mount for taking paired stereoscopic photographs with an ordinary still camera; and to provide other improvements as will hereinafter appear.

In the accompanying drawings Fig. 1 represents a plan of one form of apparatus embodying the present invention; Fig. 2 represents a section of the pivot mounting taken on line 2—2 of Fig. 1; Fig. 3 represents a perspective of the apparatus as mounted for use showing the position of the camera in dotted lines; Fig. 4 represents a plan of the apparatus sighted on an object or scene to be photographed in motion pictures and illustrating the novel method of the invention; and Fig. 5 represents a diagrammatic plan of a modified form of the invention.

Referring to the drawings, one form of the present invention consists of a base 10 upon which the camera 11 is mounted so that the aim of the camera can be controlled as desired by shifting the base 10 to the proper aiming position. For controlling this aiming position, the base 10 is fixed to a transversely disposed bar 12 the ends of which project from opposite sides of the base 10 and are respectively attached by bearing pins 13 and 14 to direction arms 15 and 16. These arms 15 and 16 are preferably of equal length and the former is attached by a pivot 17 to a link 18, while the latter is attached by a pivot 20 to a link 21.

In order to vary the distance between the arm pivots 17 and 20 to thereby fix the angle of each arm 15 and 16 with the bar 12 in sighting the arms upon a common object, the links 18 and 21 converge towards the bar 12, and overlap each other at a common pivot formed by the screw 22 and clamping nut 19, which latter traverses alined apertures 24 and 25 in the two links to form a controlled pivotal joint. A friction washer 23 is interposed between the links and encircles the pivot so that there is a restraining action at the joint to normally hold the links in an adjusted fixed position, but which can be altered at will by force of hand pressure when a new sighting of the arms 15 and 16 upon an object at a different distance is necessary. The nut 19 passes through the registered apertures 24 and 25 in the respective links 18 and 21, also through the friction washer 23, and threads onto the screw 22 of the tripod head 26 which is of the type arranged for both horizontal and vertical swing of a camera mounted thereon. A handle 27 is connected to the head 26 for proper and easy manipulation thereof.

As an aid to properly sighting the direction arms 15 and 16, a plate 29 is fixed to the link 21 to extend laterally below the end of the other link 18, and is provided with a scale 30 graduated in terms of distance. Thus, in setting the camera and device for photographing an object at say ten feet distant from the lens, the proper adjustment for correct aiming can be made by bringing the arm 15 into alinement with the ten foot graduation on the scale 30. This adjustment is assisted if a pointer 31 is attached to the end of the arm 15 in position to ride over the face of the scale 30.

In order to keep the swing of the camera within convenient angular limits, for example within 45° from a central position, a wire spring 32 is provided which extends transversely of the arms 15 and 16 substantially parallel to the bar 12. Holes 33 and 34 are drilled through the respective arms 15 and 16 in alined relation and the spring 32 passes through these holes while its protruding ends are bent over to prevent displacement of the spring 32 in operation. The holes 33 and 34 are sufficiently larger than the diameter of the spring to allow the required swing of the arms in moving the camera but at the selected limit angle the spring will bind in the holes so that a reactive force is developed which assists in returning the camera on the reverse swing and eliminates shock or jar. A sight 35 is carried by the nut 19 to aid in obtaining an accurate aim.

While the preferred form of the invention is to mount the camera to swing in a horizontal plane, it can be swung to a vertical plane by turning the tripod head to a horizontal position, and then the camera can be moved in a vertical plane.

In the operation, the device is mounted upon the tripod head by putting the screw 22 into place and so tightening it that the links 18 and 21, are in effect fixed together at a common pivot point. This arrangement with the friction washer permits the links to be moved relative to each other forcibly by hand to any desired position and then remain fixed under all ordinary strains of operation. Such relative movement is essential in order to bring the respective arms 15 and 16 to a position in which each aims at the object or point of interest to be photographed. When this is done a sight along the arm 15 will terminate at the object as will also a sight along the other arm 16. In other words, the proper adjustment for a given distance is to adjust the two arms 15 and 16 to converge upon the object. Since the camera 11 is fixed to the bar 12 it is now aiming at the object, and, of course, the tripod has been locked to maintain the device in its adjusted position. The succession of pictures is now taken and during the exposure, the camera is oscillated slowly from side to side without however disturbing the set aim of the lens upon the object. This happens because the arms 15 and 16 move on the respective pivots 17 and 20, and thus cause the camera lens to constantly hold the object or point of interest fixed in the center of all of the pictures. In operation, it has been found that a lateral speed of translation of about four inches per second is adequate to give the feeling of depth. This would be an oscillation of two seconds each way for an eight inch swing. A faster or slower speed may be used depending on the distance and character of the subject and tastes of the photographer.

From Fig. 4 of the drawings, wherein the initial adjusted position of the device is shown in full lines and one side shift of the camera in dotted lines, it will be seen that any object nearer the camera than the set focal distance will have an apparent slow side to side motion which discloses its position as near or far from the camera. Thus, object A nearer the camera than the main object B will appear as shown first in full line transverse to the line of sight and then in dotted line where one side of the object becomes visible in addition to the front of the object. When the swing of the camera is to the right, as viewed in Fig. 4, the other side of the object comes into view. Thus, by this alternate viewing of the object from one limit angle to the other limit angle, together with the lateral movement of nearer objects in one manner, and further objects in the reverse manner, an effect of realism and depth is obtained.

Under certain circumstances it is desirable to counterbalance the camera. Under these conditions the links 18 and 21 are made shorter, as shown in Fig. 5, so that they set at a relatively wide angle. The arms 15 and 16 are extended forward and provided with counterbalance weights 35 and 36. When this construction is used long swings are possible and there is no tendency to upset the tripod in any position. Portraits taken at close range with this device give a new conception of portraiture. It shows around the head. This mount is also useful for taking paired stereoscopic pictures with an ordinary still camera.

Heretofore, with the stationary camera, the backgrounds and surroundings are fixed in successive frames on the film, but with this mount in operation, the whole picture is alive and changes in each successive frame. No two are alike, and thus the interest is heightened, the realism is enhanced, and depth is made apparent.

Having thus described my invention, I claim:

1. An apparatus for creating three dimension motion pictures, consisting of a fixed support, two links having a common pivot on said support, arms respectively pivoted on said links and having bearing pins respectively on the free ends of said arms, and a bar carried by said bearing pins to support a camera, whereby oscillation of said bar moves said camera while maintaining the aim thereof constant.

2. An apparatus for creating three dimension motion pictures, consisting of a fixed support, two links having a common pivot on said support, means to hold said links in an adjusted position, arms respectively pivoted on said links and having bearing pins respectively on the free ends of said arms, and a bar carried by said bearing pins to support a camera, whereby oscillation of said bar moves said camera while maintaining the aim thereof constant.

3. An apparatus for creating three dimension motion pictures, consisting of a support for a camera, two arms pivotally mounting said support for oscillatory movement in a horizontal plane, a setting device for adjusting said arms to aim at a common object, and means to anchor said setting device in any selected sighting position, the coaction of said pivoted arms and said setting device being such that the camera is constantly aimed at said object as said support is oscillated.

4. An apparatus for creating three dimension motion pictures, consisting of a fixed support, two links having a common pivot on said support, arms respectively pivoted on said links and having bearing pins respectively on the free ends of said arms, a spring member traversing said arms and effective to limit the angular movement of said arms, and a bar carried by said bearing pins to support a camera, whereby oscillation of said bar moves said camera while maintaining the aim thereof constant.

5. An apparatus for creating three dimension pictures, consisting of a fixed support, two links having a common pivot on said support, arms respectively pivoted on said links and having bearing pins respectively on the free ends of said arms, said arms having extensions beyond said link pivots, counterweights respectively on said extensions, and a bar carried by said bearing pins to support a camera, whereby oscillation of said bar moves said camera while maintaining the aim thereof constant.

6. An apparatus for creating three dimension pictures, comprising a movable support for a camera, two arms pivoted to said support, a tripod attachment bracket, means pivotally and adjustably attaching said arms to said bracket to permit said support to swing in an arc about a fixed focal point as a center, and a scale for determining the adjustment of said arms.

EVERETT H. BICKLEY.